United States Patent [19]
McFarland

[11] 3,825,231
[45] July 23, 1974

[54] TWIN SCREW CONTINUOUS PROCESSING MACHINE

[75] Inventor: Archie Rae McFarland, Salt Lake City, Utah

[73] Assignee: Beehive Machinery Inc., Salt Lake City, Utah

[22] Filed: July 24, 1972

[21] Appl. No.: 274,574

[52] U.S. Cl............ 259/41, 99/474, 241/82.1, 259/104
[51] Int. Cl. ............ B01f 7/04, B01f 7/08
[58] Field of Search............ 259/6, 21, 41, 64, 104, 259/192; 99/348, 474, 475, 476; 241/82.1, 101 R, 101 B, 101.2

[56] References Cited
UNITED STATES PATENTS

| | | | |
|---|---|---|---|
| 2,898,052 | 8/1959 | Kautz................................ | 241/82.1 |
| 3,176,966 | 4/1965 | Rietz et al......................... | 259/6 X |
| 3,421,740 | 1/1969 | Behrens............................. | 259/6 X |
| 3,643,928 | 2/1972 | Stollman et al.................... | 259/6 |

FOREIGN PATENTS OR APPLICATIONS

| | | | |
|---|---|---|---|
| 315,349 | 11/1919 | Germany ........................... | 241/82.1 |
| 669,982 | 9/1963 | Canada.............................. | 241/82.1 |

Primary Examiner—Harvey C. Hornsby
Assistant Examiner—Philip R. Coe
Attorney, Agent, or Firm—Philip A. Mallinckrodt

[57] ABSTRACT

A pair of conveyor screws located in side-by-side relationship on fixed, substantially horizontal axes at the bottom of a vessel such as a feed hopper are adapted to be rotated, preferably toward each other, to provide mixing action, and are preferably located peripherally of such bottom to provide a peripheral conveying path to a discharge outlet. One of the screws serves to transfer material to the other screw, whose discharge end is substantially coincident with the discharge outlet of the vessel. In material-processing equipment, wherein the vessel constitutes a feed hopper, a passage leads from the discharge outlet and communicates with material-processing mechanism, such as a grinder, meat or fish deboner, etc. A pump may be interposed in such passage for advancing the discharge material from the hopper under pressure to the processing mechanism. A preferred aspect of the invention is to provide respective troughs at the bottom of the hopper for the conveyor screws, and to provide a material-transferring means at the discharge end of the transfer screw and a by-pass from the discharge end of the trough of the discharge screw to the trough of the transfer screw, so the material will idly circulate within the vessel if the discharge outlet is obstructed for any reason.

2 Claims, 5 Drawing Figures

3,825,231

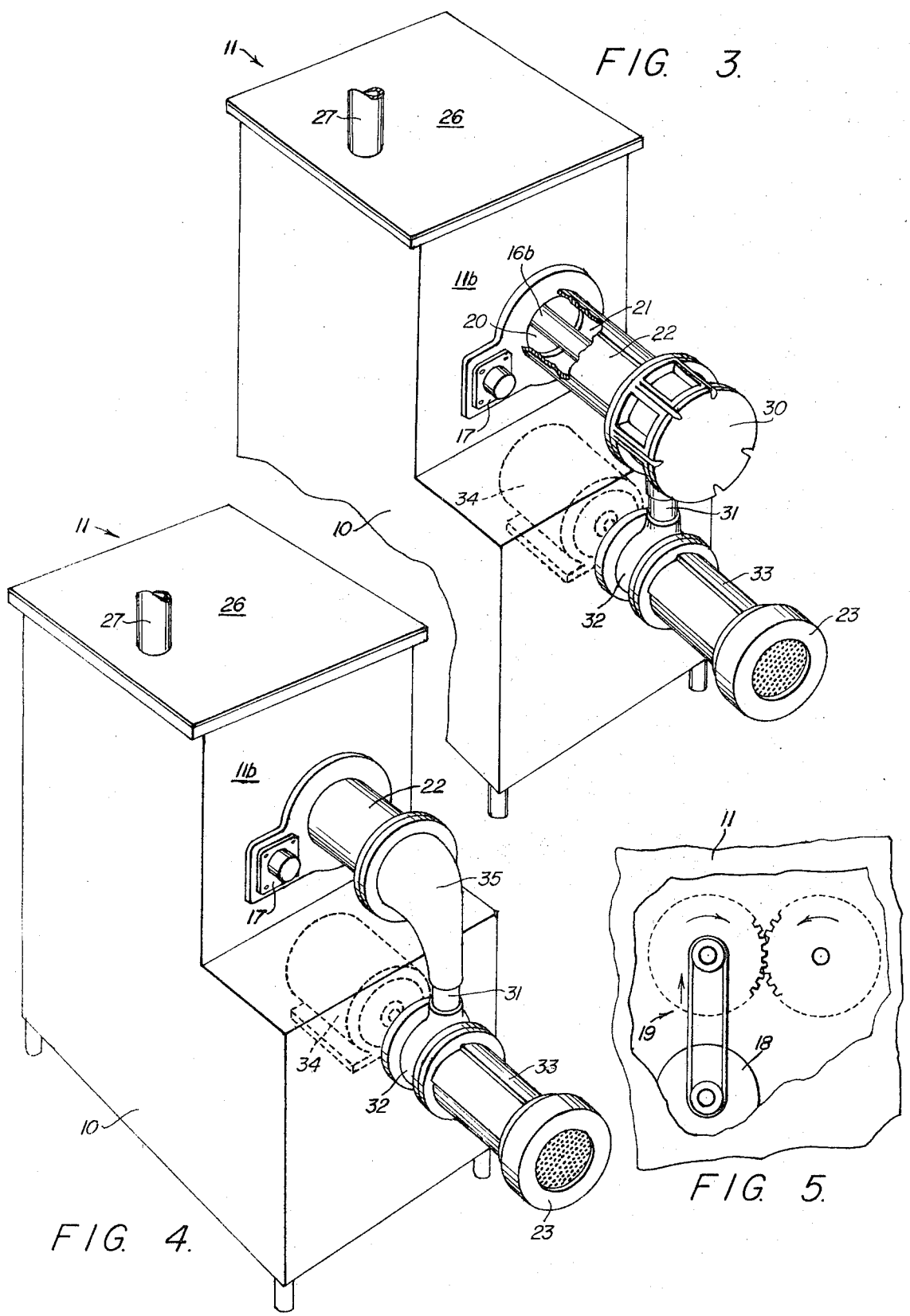

TWIN SCREW CONTINUOUS PROCESSING MACHINE

BACKGROUND OF THE INVENTION

1. Field:

The invention is in the field of machines for material to be processed or merely mixed, especially meat and fish products to be ground, deboned, or otherwise treated.

2. State of the Art:

Material mixing machines have long been constructed with a plurality of screws or beaters rotatably mounted within a mixing vessel. In at least one instance, U.S. Pat. No. 3,430,424, such a machine has been constructed for continuous operation on material continuously introduced at one end of a mixing vessel and continuously discharged at the opposite end.

SUMMARY OF THE INVENTION

In accordance with the present invention, a vessel which is usually of the nature of a feed hopper, is provided to continuously feed material, such as meat or fish, to processing equipment, such as a meat grinder, or a deboner, or for use merely as a mixing vessel if desired. In any event, the material is introduced into a vessel, whose top is usually open but may be closed in special instances, such as the handling of red meat under a $CO_2$ atmosphere, which vessel is provided at or near its bottom with a pair of conveyor screws mounted side-by-side on substantially horizontal axes for rotation toward each other. The screws are preferably located peripherally of the bottom of the vessel to provide a peripheral path of travel for the material charged into the vessel, one screw serving to transfer the material to the other whose discharge end is substantially axially aligned with a discharge outlet from the vessel. The vessel is usually arranged as a feed hopper discharging into a passage leading to material-processing mechanism, such as a grinder, deboner, etc.

Is is advantageous that troughs be formed in the bottom of the vessel for the respective screws and that material transfer means be provided at the discharge end of the transfer screw. As such transfer means, a paddle attached to the transfer screw serves effectively to raise material from one trough and pass it on into the feed end of the discharge screw in the second trough. As a safety measure, or, under some circumstances, to provide a longer mixing time in the vessel, a by-pass around the discharge outlet is provided, desirably by notching the ridge between the two troughs at the discharge end thereof. Thus, if there is an inadvertant stoppage in the discharge passage leading from the machine, as may sometimes happen if the grinder or deboning equipment, etc., clogs, or if stoppage is purposely caused, as by closing a valve to improve mixing, closed circuit circulation within the vessel takes place.

In many instances, it may be desirable to interpose a pump in the discharge passage to provide pressure feeding of material to the grinder, deboner, or other processing mechanism.

THE DRAWINGS

The best mode presently contemplated of carrying out the invention in actual practice is disclosed on the basis of several different specific embodiments of meat grinders, as illustrated in the accompanying drawings, in which:

FIG. 1 is a pictorial view, looking from front to rear, of one form of meat grinder in accordance with the invention, a portion of the feed hopper being broken away to reveal the twin screws and the material-transfer ends thereof, the drive mechanism being indicated schematically in dotted lines;

FIG. 2, a similar but fragmentary view of the same machine looking from the rear to front to show the by-pass arrangement and with added cover and $CO_2$ input;

FIG. 3, a view similar in more respects to that of FIG. 1, but showing a pump interposed between hopper outlet and grinder, with separate drives for screws and pump and for the grinder; and FIG. 4, a view corresponding to FIG. 3, but showing the pump replaced with an elbow conduit for conducting the material to the separately driven grinder; and FIG. 5, a fragmentary view in rear elevation showing typical drive mechanism for the twin screws.

DETAILED DESCRIPTION OF ILLUSTRATED EMBODIMENT

In the illustrated embodiment, the invention is incorporated in meat grinding equipment and several different versions of such equipment are disclosed. The material-receiving vessel is of the nature of a feed hopper for continuously passing material into processing mechanism.

Figure 1:
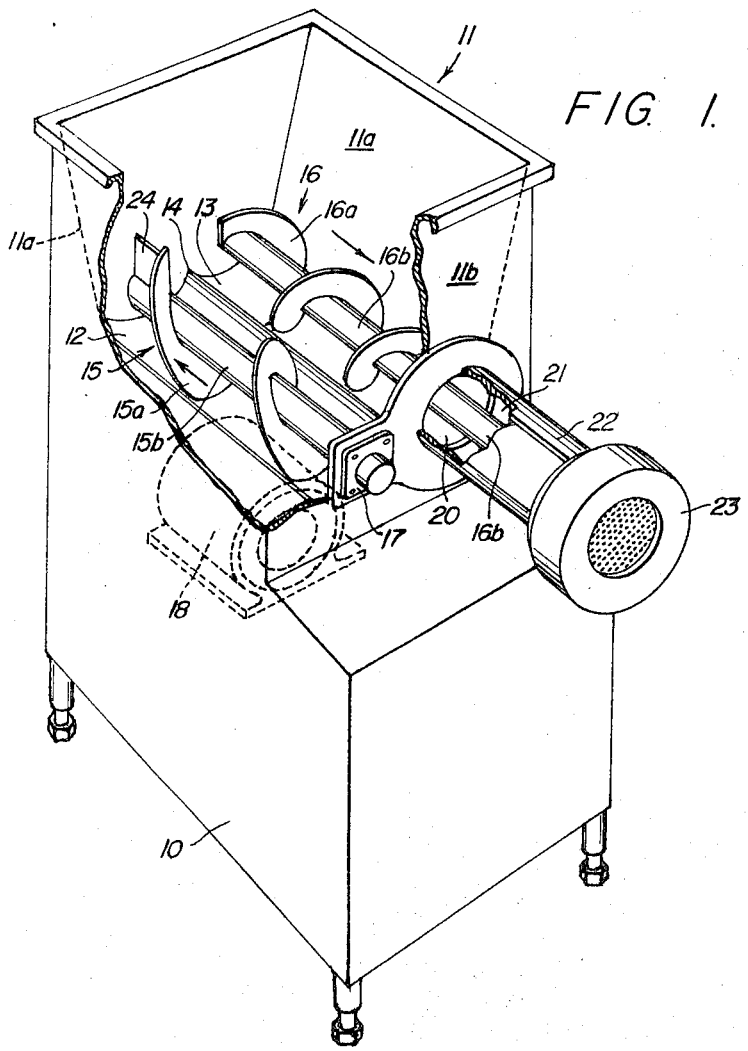

In FIG. 1, the processing equipment of the invention comprises a housing 10 whose upper part is formed as an open feed hopper 11. Such feed hopper has convergent lateral walls 11a, 11a interiorly thereof and a bottom wall forming a pair of elongate, mutually parallel, throughs 12 and 13 lying side-by-side peripherally of the bottom of the hopper and separated by a ridge 14.

Rotatably mounted in the troughs 12 and 13 is a pair of conveyor screws 15 and 16, respectively, comprising helical flights 15a and 16a, respectively, secured to and extending along shafts 15b and 16b, respectively, such shafts being journaled in suitable bearings, such as 17 mounted on the front wall 11b of hopper 11.

The screws 15 and 16 are peripherally rotated toward each other, as by means of an electric motor 18 transmitting power to corresponding ends of the shafts 15b and 16b by means of drive mechanism indicated generally at 19, FIG. 5. It is preferred that the pitch of screw 16 be less than the pitch of screw 15, for example 6 inches as compared to 12 inches.

Shaft 16 passes through an outlet opening 20 in the front wall 11b of hopper 11, that is provided for the discharge of material from such hopper, and continues on through a discharge passage 21 in conduit 22 as the drive shaft of a conventional meat grinder mechanism 23.

As so placed, the twin screws 15 and 16 serve to both mix material inserted into the hopper and convey it toward the discharge opening 20. Screw 15 serves to convey material from front to rear of the hopper, along one side thereof, and to transfer such material to the other screw 16 at the rear end of the hopper. For facilitating such transfer of material, screw 15 is preferably provided with a paddle 24 at its rear end, that serves to lift material out of the trough 12 and force it over into the rear end of screw 16.

To guard against continual forcing of material through outlet opening 20 of the hopper and into the passage 21 leading to grinder 23 if and when such grinder becomes clogged or otherwise inoperative for any reason, a bypass from discharge screw 16 to transfer screw 15 is preferably provided at the forward ends of such screws. This advantageously takes the form of a notch 25, FIG. 2, at the forward end of ridge 14, thereby providing a non-restricted path of flow of material from discharge screw to transfer screw and enabling the material within hopper 11 to idly circulate within and peripherally of such hopper until such time as the stoppage is corrected.

Figure 2:
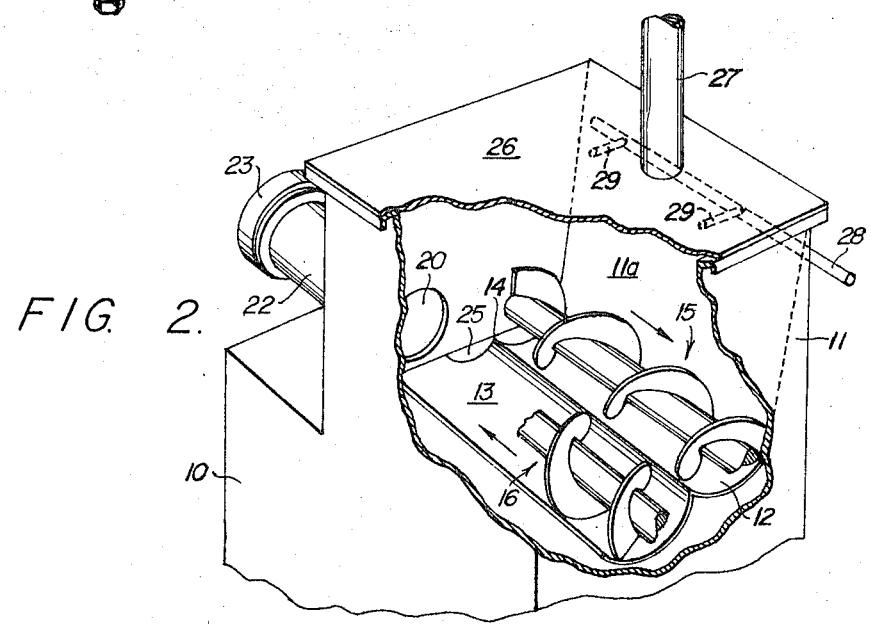

In FIG. 2, the processing equipment, i.e., machine, is the same as in FIG. 1, except for the addition of means to maintain the material in the hopper in a $CO_2$ atmosphere. Thus, a cover 26 is placed tightly over the otherwise open top of feed hopper 11 and material is charged into such hopper through a pipe 27. $CO_2$ gas is charged into the hopper through a manifold 28 and offtake pipes 29 leading therefrom to port openings through a hopper wall 11a.

The embodiment of FIG. 3 corresponds to that of FIG. 1, except for the interposing of a material-advancing pump 30 in the discharge passage leading from discharge outlet 20 to grinder 23 and for the accompanying rearrangement of such discharge passage so the grinder can be independently powered.

As illustrated in FIG. 3, passage 21 through conduit 22 leads directly to pump 30, which discharges through an outlet pipe 31 and pipe fitting 32 into the rear end of a second conduit 33 leading directly to grinder 23. In this instance, pump 30 is driven by the extension of conveyor screw shaft 16b, while grinder 23 is driven by a shaft (not shown) extending from a second electric motor 34.

The embodiment of FIG. 4 is similar to that of FIG. 3, except that the pump is eliminated and replaced with an elbow adapter pipe fitting 35 to provide a through flow passage leading from conduit 22 into pipe 31 and thence through pipe fitting 32 into a conduit 33 and grinder 23.

Whereas the invention is here illustrated with respect to specific embodiments thereof, it is to be understood that these merely represent the best mode presently contemplated of carrying out the invention in practice and many variations are possible without departing from the claimed inventive concepts.

I claim:

1. A twin screw, continuous, processing machine, comprising a vessel adapted to receive material to be processed; a pair of conveyor screws arranged side-by-side in fixed relationship at the bottom of said vessel, said bottom being formed as twin troughs for receiving the respective conveyor screws, said troughs being separated by a ridge; a discharge outlet in a wall of said vessel and substantially in axial alignment with one of said screws at one end thereof, the other of said screws being arranged to convey material toward the opposite end of said one screw and to transfer material to the said one screw at said opposite end thereof, said one screw being arranged to convey material toward and to force it through said discharge outlet; material by-pass means in the form of a notch in said ridge in the bottom of the vessel at the said one end of the said one screw; and means for rotating said screws.

2. A twin screw, processing machine in accordance with claim 1, wherein a paddle member is secured to the end of the specified other screw at the specified opposite end of the one screw.

* * * * *